United States Patent
Matsuzaki

(10) Patent No.: US 10,253,478 B2
(45) Date of Patent: Apr. 9, 2019

(54) WORK VEHICLE AND RUNNING CONTROL APPARATUS CAUSING AUTOMATIC RUNNING OF WORK VEHICLE

(71) Applicant: Kubota Corporation, Osaka-shi (JP)

(72) Inventor: Yushi Matsuzaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/615,095

(22) Filed: Jun. 6, 2017

(65) Prior Publication Data

US 2017/0268202 A1 Sep. 21, 2017

Related U.S. Application Data

(62) Division of application No. 14/895,255, filed as application No. PCT/JP2015/076919 on Sep. 24, 2015, now Pat. No. 9,708,793.

(30) Foreign Application Priority Data

Mar. 11, 2015 (JP) .................... 2015-048648
Mar. 11, 2015 (JP) .................... 2015-048649

(51) Int. Cl.
*E02F 9/26* (2006.01)
*E02F 9/20* (2006.01)
(Continued)

(52) U.S. Cl.
CPC .............. *E02F 9/205* (2013.01); *A01B 69/00* (2013.01); *A01B 69/008* (2013.01); *B60W 30/14* (2013.01);
(Continued)

(58) Field of Classification Search
CPC ................. E02F 9/205; A01B 69/205
See application file for complete search history.

(56) References Cited

U.S. PATENT DOCUMENTS

| 2004/0207247 A1* | 10/2004 | Jackson ............... E21C 25/16 299/85.1 |
| 2005/0056730 A1* | 3/2005 | Nagayama ............ B64C 13/16 244/175 |
| 2006/0020429 A1 | 1/2006 | Brooks et al. |
| 2006/0025913 A1* | 2/2006 | Horikawa ........... B60R 21/0134 701/45 |
| 2008/0294309 A1* | 11/2008 | Kaprielian ........... A01B 69/008 701/27 |

(Continued)

FOREIGN PATENT DOCUMENTS

| JP | H2282566 A | 11/1990 |
| JP | 819 A | 1/1996 |
| JP | 2014180894 A | 9/2014 |

*Primary Examiner* — Jess Whittington
(74) *Attorney, Agent, or Firm* — The Webb Law Firm

(57) ABSTRACT

A work vehicle includes an automatic running control unit 51 that executes automatic running based on an own vehicle position and a target running path; a manual running control unit 52 that executes manual running based on an operation signal from a manual running operation unit 9 that is manually operated; a first control unit 61 that executes a change from manual running to automatic running, a manual stoppage of the vehicle being a condition for the change; a second control unit 62 that executes a forced stoppage of the vehicle when changing from automatic running to manual running; and a third control unit 63 that executes a forced stoppage of the vehicle by temporarily suspending automatic running in response to a suspend instruction from the manual running operation unit 9, and resumes automatic running in response to a resume instruction from the manual running operation unit 9.

8 Claims, 7 Drawing Sheets

(51) Int. Cl.
  *A01B 69/00* (2006.01)
  *B60W 50/10* (2012.01)
  *B60W 30/14* (2006.01)
  *G05D 1/02* (2006.01)
  *G05D 1/00* (2006.01)
  *A01B 69/04* (2006.01)

(52) U.S. Cl.
  CPC ........... B60W 50/10 (2013.01); E02F 9/2045 (2013.01); E02F 9/2087 (2013.01); E02F 9/262 (2013.01); G05D 1/0061 (2013.01); G05D 1/02 (2013.01); G05D 1/0212 (2013.01); G05D 1/0278 (2013.01); *G05D 2201/0201* (2013.01)

(56) References Cited

U.S. PATENT DOCUMENTS

| | | | |
|---|---|---|---|
| 2013/0100281 A1* | 4/2013 | Sharma | G06K 9/00805 348/135 |
| 2013/0197760 A1* | 8/2013 | Castaneda | B66F 9/07581 701/41 |
| 2015/0046054 A1* | 2/2015 | Takahashi | B60T 7/22 701/70 |
| 2015/0134176 A1* | 5/2015 | Ham | G01C 21/28 701/23 |
| 2015/0361640 A1* | 12/2015 | Faivre | E02F 3/844 701/50 |
| 2016/0240084 A1* | 8/2016 | Takeuchi | G08G 1/165 |
| 2017/0183005 A1* | 6/2017 | Elston | B66F 9/0755 |

* cited by examiner

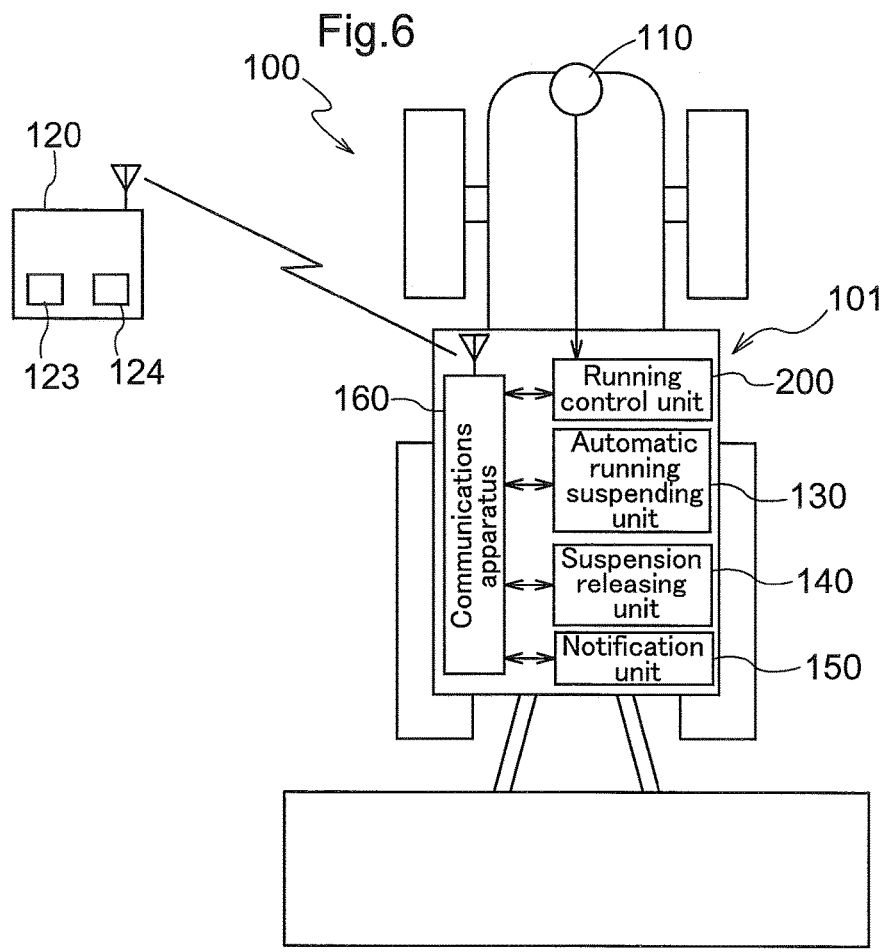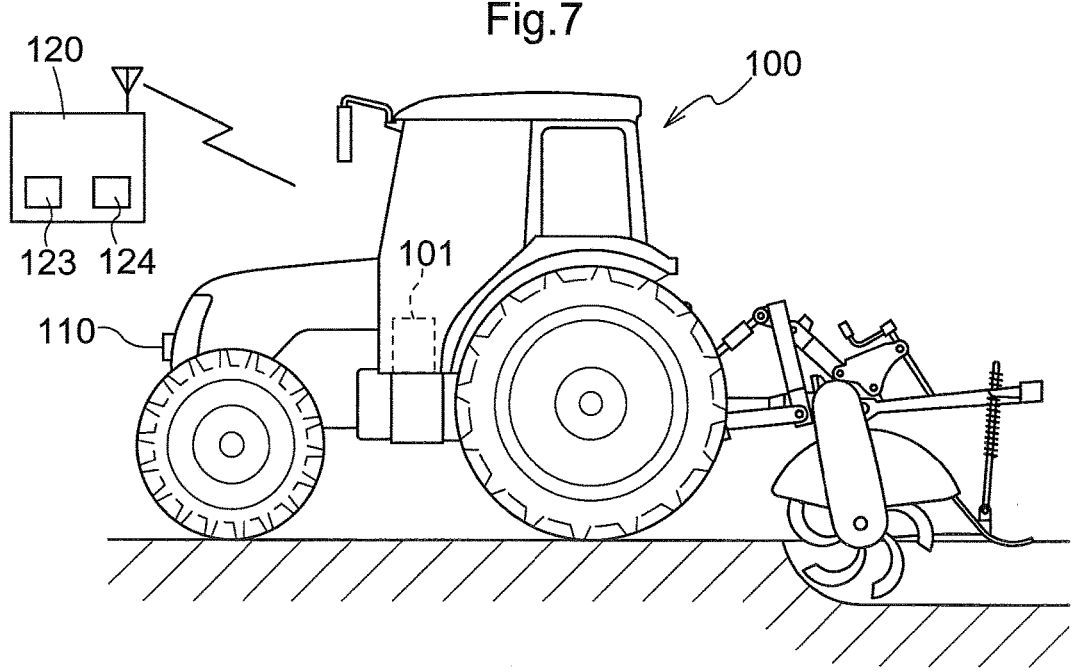

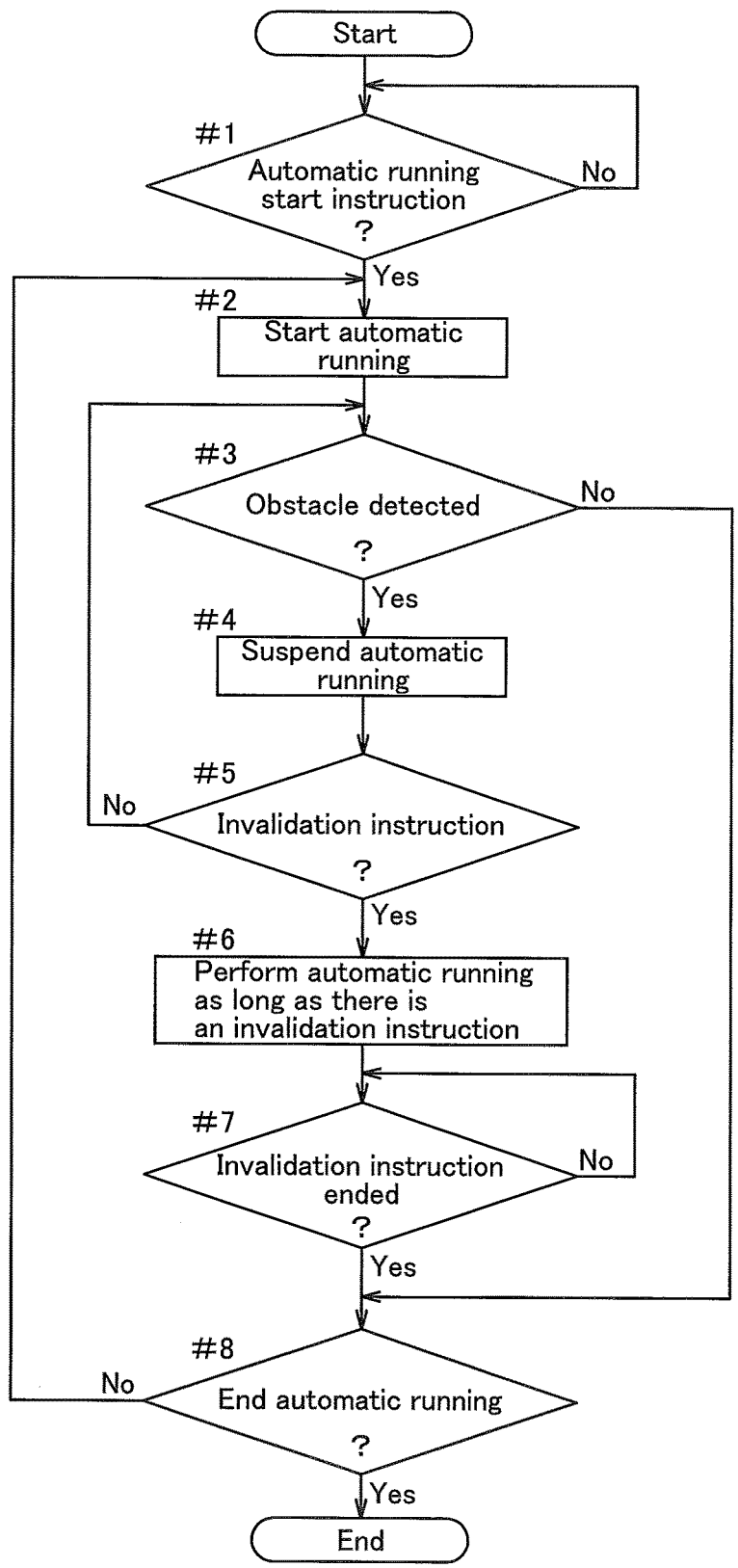

WORK VEHICLE AND RUNNING CONTROL APPARATUS CAUSING AUTOMATIC RUNNING OF WORK VEHICLE

CROSS-REFERENCE TO RELATED APPLICATIONS

This application is a divisional application of U.S. patent application Ser. No. 14/895,255, filed Dec. 2, 2015, entitled "Work Vehicle and Running Control Apparatus Causing Automatic Running of Work Vehicle", which is a United States national phase of International Application No. PCT/JP2015/076919 filed Sep. 24, 2015, and claims priority to Japanese Patent Application Nos. 2015-048648 and 2015-048649, both filed Mar. 11, 2015, the disclosures of which are hereby incorporated in their entirety by reference.

TECHNICAL FIELD

The present invention relates to a work vehicle and a running control apparatus that causes automatic running of the work vehicle.

BACKGROUND ART

As a work vehicle having an automatic running control unit that executes automatic running based on an own vehicle position and a target running path, and a manual running control unit that executes manual running based on manual operation, conventionally, there is the work vehicle described in Patent Document 1.

Patent Document 1 discloses a running vehicle provided with a mode switching means configured to switch modes between an automatic running mode that enables automatic running along a set path, a manual running mode that enables running of the vehicle according to a human operation, an automatic running preparation mode, and a manual running preparation mode. The automatic running preparation mode is a mode of transition from the manual running mode to the automatic running mode, in which an engine changes to idling speed to establish a running stoppage state, and waits until a running work start instruction is issued. In the automatic running preparation mode, data necessary for automatic running is prepared and when an automatic running start instruction is issued, the mode changes to the automatic running mode. Also, in the automatic running preparation mode, when automatic running suspension conditions are satisfied, or when at least a set time after transition has passed, the mode changes to the manual running preparation mode. The manual running preparation mode is a mode of transition from the automatic running mode to the manual running mode, in which the engine changes to idling speed to establish a running stoppage state.

Conventionally, technology has come to be used that causes a work vehicle to run automatically. It is convenient to use this sort of work vehicle that runs automatically, for example, when performing predetermined work (for example, mowing) on vast cultivated land. An example of this type of technology is disclosed in Patent Document 2 cited below.

An unmanned running apparatus described in Patent Document 2 automatically causes running of an unmanned running vehicle such as an unmanned mowing machine. In the technology described in Patent Document 2, the unmanned running vehicle is equipped with an obstacle sensor and a notification means, and in a case where an obstacle was detected by the obstacle sensor, the unmanned running vehicle is temporarily stopped. In this state, if the obstacle detection is released within a predetermined time, automatic running is resumed, and if the obstacle continues to be detected for at least a predetermined time, the engine is stopped and the notification means issues a warning.

PRIOR ART DOCUMENTS

Patent Documents

Patent Document 1: JP 2014-180894A
Patent Document 2: JP H08-000019A

DISCLOSURE OF THE INVENTION

Problems to be Solved by the Invention

[1] Problems corresponding to Background Art [1] are as follows.

In the running vehicle according to Patent Document 1, the manual running preparation mode is interposed when changing from automatic running to manual running, and the automatic running preparation mode is interposed when changing from manual running to automatic running, so it is possible to suppress accidental movement of the vehicle when changing from automatic running to manual running or when changing from manual running to automatic running. However, during execution of automatic running, it is frequently necessary to temporarily suspend automatic running in order to check vehicle surroundings or check the work state. Then, automatic running is resumed after the check has ended. In this sort of automatic running of work, if the manual running preparation mode or the automatic running preparation mode is always entered after automatic running or manual running was ceased as disclosed in Patent Document 1, automatic running becomes inconvenient in circumstances in which automatic running is frequently suspended.

Due to the above situation, there are demands for control that, in an automatic running state, efficiently realizes suspension and resuming of automatic running.

[2] Problems corresponding to Background Art [2] are as follows.

In cultivated land, there are cases where all regions are not flat, but rather, for example, a ridge or irrigation ditch or the like is provided, or plants are growing within the cultivated land. In such a case, with the technology described in Patent Document 2, it is possible that the obstacle sensor will mistakenly detect these, and so automatic running will be suspended when it is fundamentally not necessary to suspend automatic running.

The present invention was made in consideration of the foregoing problems, and it is an object thereof to provide a running control apparatus capable of easily resuming automatic running in a case where automatic running was suspended due to mistaken detection of an obstacle.

Means for Solving Problem

[1] The solving means corresponding to problem [1] is as follows.

A work vehicle according to the present invention is provided with an own vehicle position detection module configured to detect an own vehicle position; a path calculation unit configured to calculate a target running path; an automatic running control unit configured to execute automatic running based on the own vehicle position and the target running path; a manual running operation unit configured to be manually operated; a manual running control unit configured to execute manual running based on an operation signal from the manual running operation unit; a first control unit configured to execute a change from manual running by the manual running control unit to automatic running by the automatic running control unit, a manual stoppage of the vehicle being a condition for the change; a second control unit configured to execute a forced stoppage of the vehicle when changing from automatic running by the automatic running control unit to manual running by the manual running control unit; and a third control unit configured to execute a forced stoppage of the vehicle by temporarily suspending automatic running by the automatic running control unit in response to a suspend instruction from the manual running operation unit, and configured to resume automatic running by the automatic running control unit in response to a resume instruction from the manual running operation unit.

According to this configuration, when changing from manual running to automatic running, a state is interposed in which the vehicle is stopped with operation by the operator him/herself, and when changing from automatic running to manual running, a state is interposed in which the vehicle is forcibly stopped automatically, so accidental movement of the vehicle when changing from automatic running to manual running or when changing from manual running to automatic running is suppressed. Further, when performing automatic running, by manually giving a suspend instruction, automatic running is temporarily suspended and the vehicle is forcibly stopped. If the reason for suspending automatic running is no longer present, automatic running is resumed by manually giving a resume instruction. As a result, during execution of automatic running, temporary suspension and resuming of automatic running in order to check vehicle surroundings, check a work state, or the like are smoothly and appropriately realized.

Ordinarily, automatic running means unmanned running, and a change from manual running to automatic running needs to be performed carefully in order to avoid accidental movement of the vehicle. Therefore, it is important to prepare a plurality of conditions for a change from manual running to automatic running, and reliably presume the intent of the operator of the change from manual running to automatic running. Accordingly, in one suitable embodiment of the present invention, the first control unit presumes a change to automatic running based on a condition of at least any one of input of a detection signal that indicates detection of a neutral state of a forward/backward operation tool, input of a detection signal that indicates detection of an OFF state of a PTO driving operation tool, input of a detection signal that indicates detection of an active state of an automatic running signal, and existence of an automatic running request signal to request automatic running, and the first control unit, while presuming the change to automatic running, permits execution of automatic running by the automatic running control unit in response to input of an automatic running permission signal to permit automatic running.

During manual running, an operator boards and controls the vehicle, but during automatic running, ordinarily the operator exits the vehicle and observes the automatically running vehicle from outside of the vehicle. Therefore, in one suitable embodiment of the present invention, the automatic running request signal is generated by operating an internal operation device provided in the work vehicle, and the automatic running permission signal is generated by a remote operation device (remote control) configured to be operated from outside of the work vehicle. Thus, during automatic running, the operator can, for example, perform or observe other work or the like even while observing the automatic running from a location apart from the vehicle.

When changing from automatic running to manual running, it is likely that the operator is not in the vehicle, so it is necessary to instruct stoppage of automatic running by a remote operation. Further, during an emergency, it is necessary for the operator to board the vehicle and directly stop automatic running. Therefore, in one suitable embodiment of the present invention, the second control unit executes a forced stoppage in order to change from automatic running by the automatic running control unit to manual running by the manual running control unit in response to any one of an operation to change a vehicle speed setting, operation of a manual control device, existence of an automatic running unnecessary signal that cancels a request for automatic running, and an automatic running stop instruction by a remote operation device configured to be operated from outside of the work vehicle. If a configuration is adopted in which after this forced stoppage, execution of manual running is permitted based on a manual operation of the vehicle in order to perform manual running, a more appropriate change to manual running is realized.

[2] The solving means corresponding to problem [2] is as follows.

In a characteristic configuration of a running control apparatus according to the present invention for attaining the above object, in order to cause a work vehicle to perform automatic running, the running control apparatus is provided in the work vehicle, and includes an obstacle detection unit provided in the work vehicle and configured to detect an obstacle that exists in surroundings of the work vehicle; a controller having a switch configured to perform a start instruction to the work vehicle to start automatic running, a suspend instruction to suspend the automatic running, and an invalidation instruction to invalidate obstacle detection by the obstacle detection unit; an automatic running suspending unit configured to, after the work vehicle started automatic running in response to the start instruction, in a case where the obstacle detection unit detected the obstacle, suspend automatic running of the work vehicle regardless of whether or not there is the suspend instruction; and a suspension releasing unit configured to release the suspension of automatic running in a case where there was the invalidation instruction during the suspension of automatic running by the automatic running suspending unit.

By adopting this sort of characteristic configuration, it is possible for the automatic running suspending unit to suspend automatic running of the work vehicle in a case where the obstacle detection unit detected an obstacle. Also, when the user wishes to resume the suspended automatic running, the user can give an instruction by a switch operation even from a location apart from the work vehicle. Accordingly, the user does not have to make a point of moving to the work vehicle in order to resume automatic running of the work vehicle, so the user does not feel troubled. Further, for example, even in a case where an obstacle was mistakenly detected by the obstacle detection unit, although automatic running is suspended, the suspension of automatic running can be released in response to switch operation by the user to resume automatic running. Accordingly, work performed with the work vehicle can be performed smoothly. Also, even in a case where the work vehicle performs automatic running in a location where many objects exists for which it is not easy to determine whether or not an object is an obstacle, it is possible to easily resume automatic running, so a worsening of work efficiency can be prevented.

Also, it is suitable to provide a notification unit configured to notify the surroundings of the work vehicle that automatic running is suspended in a case where automatic running has been suspended by the automatic running suspending unit.

By adopting this sort of configuration, it is possible to notify the surroundings that the work vehicle has suspended automatic running because an obstacle was detected by the obstacle detection unit.

Also, it is suitable that the notification unit continuously gives notification that automatic running is suspended even in a case where there was the invalidation instruction.

By adopting this sort of configuration, it is possible to notify the surroundings that suspension of automatic running has been released by the suspension releasing unit.

Also, it is suitable that the switch performs the invalidation instruction throughout a period where the switch is being depressed.

By adopting this sort of configuration, for example, in a circumstance where mistaken detection by the obstacle detection unit continues, it is possible to prevent a suspension of automatic running according to the intent of the user. Also, suspension of automatic running due to detection of an obstacle is invalidated in a case where the user is continuing to depress the switch, so it is possible to release invalidation of suspension of automatic running according to the intent of the user. Accordingly, it is possible to suspend automatic running in a case where the switch is depressed so automatic running is resumed, and then after the user stops depressing the switch, an obstacle is again detected by the obstacle detection unit.

Alternatively, a configuration may be adopted in which when the switch is depressed, the switch performs the invalidation instruction only for a period of time that has been set in advance.

With this sort of configuration as well, it is possible to suspend automatic running in a case where suspension of automatic running is released, and then after resuming automatic running, an obstacle is again detected. Also, for example, in a circumstance where suspension of automatic running occurs many times due to detecting an obstacle, it is possible to prevent the user from intentionally releasing suspension of automatic running throughout a long period of time. Further, when wishing to resume automatic running that was suspended, it is necessary for the user to again depress the switch, so it is possible to avoid mistaken operation due to a broken switch.

Also, it is suitable that the obstacle detection unit continuously performs the obstacle detection even in a case where there is the invalidation instruction.

By adopting this sort of configuration, it is possible to detect not only the obstacle for which automatic running is suspended, but also another obstacle.

Also, it is suitable that the switch, during a stoppage of the work vehicle, performs the start instruction in a case where the depressed time period is less than the first time period that has been set in advance, and during the suspension of automatic running, performs the invalidation instruction in a case where the depressed time period is at least the first time period.

By adopting this sort of configuration, it is possible to prevent mistakenly continuing an exception instruction of suspending automatic running that invalidates obstacle detection by the obstacle detection unit.

Other characteristic configurations and advantageous effects resulting therefrom will become clear by reading the below description with reference to the attached drawings.

BRIEF DESCRIPTION OF THE DRAWINGS

FIG. 6 shows a second embodiment of the present invention (also true through FIG. 10 below), and schematically shows the configuration of a running control apparatus.

FIG. 7 schematically shows a tractor that is an example of a work vehicle provided with the running control apparatus.

FIG. 10 is a flowchart that shows processing of the running control apparatus.

BEST MODE FOR CARRYING OUT THE INVENTION

First Embodiment

Figure 1:
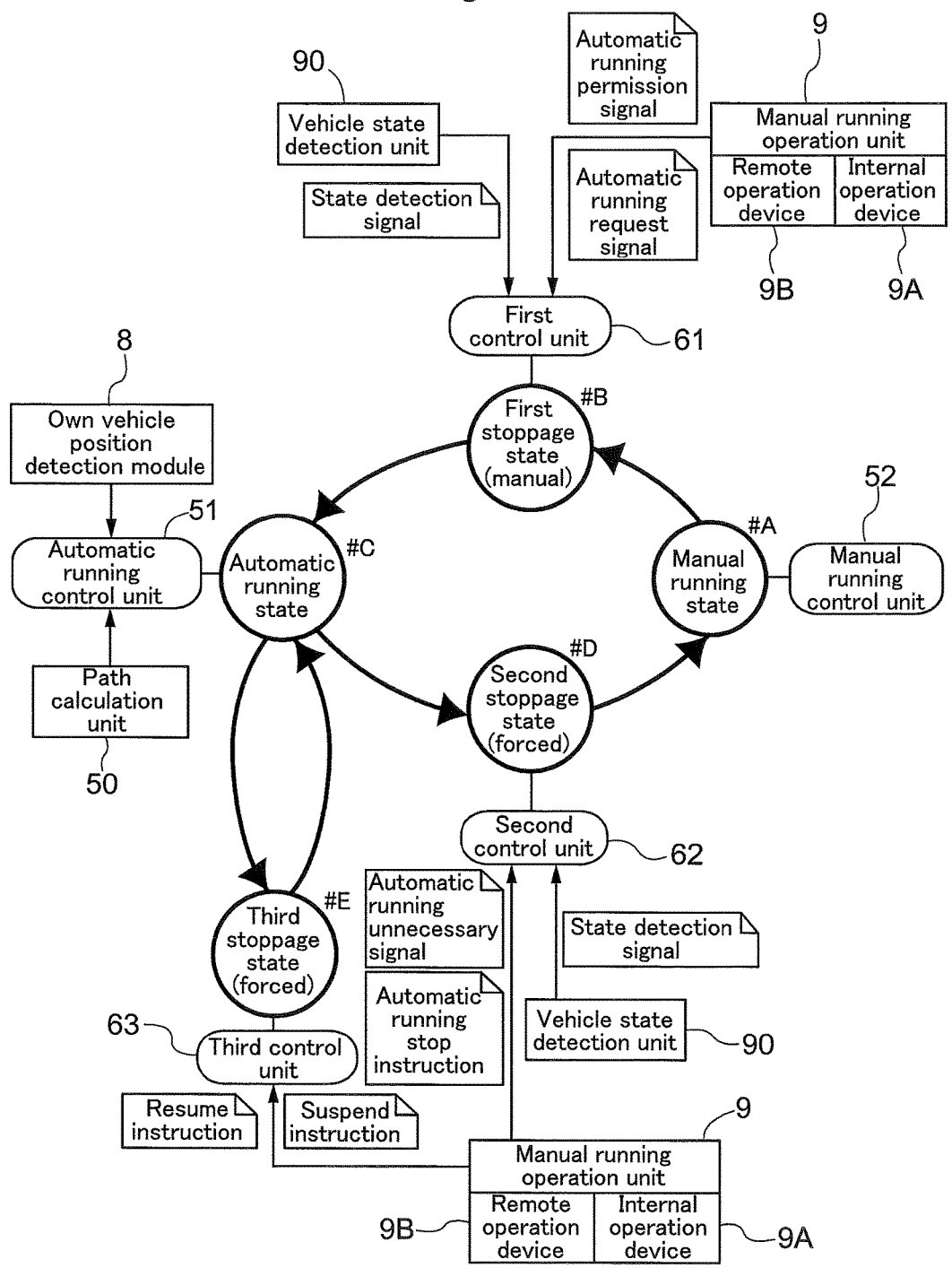
FIG. 1 shows a first embodiment of the present invention (also true through FIG. 5 below), and is a schematic diagram that schematically shows basic principles of control to switch between manual running and automatic running.

Below, a first embodiment will be described with reference to FIGS. 1 to 5.

Before describing a specific embodiment of a work vehicle according to the present invention, basic principles related to vehicle stoppage when switching between manual running and automatic running will be described with reference to FIG. 1. The work vehicle in this description includes an own vehicle position detection module 8 that detects an own vehicle position using a Global Positioning System (GPS) or the like and a manual running operation unit 9 that is operated manually, and as a control system, includes a path calculation unit 50, an automatic running control unit 51, and a manual running control unit 52. The path calculation unit 50 calculates a target running path that is a work running path in a work subject ground. The automatic running control unit 51 causes automatic running of the vehicle (in an automatic running state of the vehicle) based on the target running path and an own vehicle position obtained from the own vehicle position detection module 8. The manual running control unit 52 causes manual running of the vehicle (in a manual running state of the vehicle) based on manual operation of the manual running operation unit 9, which includes a manual control device that is a control handle or a control lever, and a gearshift lever, a brake pedal, and the like.

Further, in the control system, a first control unit 61 that functions when switching between manual running by the manual running control unit 52 and automatic running by the automatic running control unit 51, a second control unit 62, and a third control unit 63 are constructed.

The first control unit 61 manages a change from manual running by the manual running control unit to automatic running by the automatic running control unit 51, and when doing so, a stoppage of the vehicle by manual operation is used as a condition for the change in that control. That is, in manual running, a change from manual running to automatic running is not allowed unless an operator temporarily causes a vehicle stoppage. This manual stoppage of the vehicle is described in FIG. 1 as a first stoppage state.

The second control unit 62 automatically executes a forced stoppage of the vehicle when changing from automatic running by the automatic running control unit 51 to manual running by the manual running control unit 52. This automatic stoppage of the vehicle is described in FIG. 1 as a second stoppage state.

The third control unit 63 executes a forced stoppage of the vehicle by temporarily suspending automatic running by the automatic running control unit 51 in response to a suspend instruction from the manual running operation unit 9. This forced temporary stoppage of the vehicle is described in FIG. 1 as a third stoppage state. Further, the third control unit 63 causes the vehicle, in a stopped state with automatic running suspended, to resume automatic running by the automatic running control unit 51 in response to a resume instruction from the manual running operation unit 9.

Next, with reference to FIG. 1, is a description of changes between the automatic running state, the manual running state, the first stoppage state, the second stoppage state, and the third stoppage state.

(1) An operator boards the work vehicle as a driver, and causes the work vehicle to perform work running by a manual operation (Step #A). In this manual running state, running control by the manual running control unit 52 functions based on operation instructions from a manual control device provided within the vehicle.

(2) When changing from this manual running state to the automatic running state, the driver stops work running of the vehicle. Further, the first control unit 61 presumes a change to automatic running based on conditions of input of a detection signals that indicate detection of a neutral state of a forward/backward operation tool (shuttle operation tool), detection of an OFF state of a PTO driving operation tool, and confirmation of an automatic running possible state and detection of an active state of a signal for automatic running, and, existence of an automatic running request signal that requests automatic running, and the like. In confirmation of the automatic running possible state, for example, a check is performed of whether or not a signal (such as a GPS signal) related to the own vehicle position has been input from the own vehicle position detection module 8, and the fact that one automatic running possible state has been confirmed via input confirmation of that signal is set with a state flag or the like. This confirmation of the automatic running possible state is performed when changing from the manual running state to the automatic running state, so a change from the manual running state to the automatic running state is prohibited when the automatic running possible state has not been confirmed, that is, in a state such as when automatic running is deemed to be impossible. One example of an automatic running request signal is a signal generated by operation of the manual running operation unit 9 such as a switch, a button, or the like provided within the work vehicle. This sort of state in which a change to automatic running is presumed is denoted as a first stoppage state (Step #B). As described above, in the first stoppage state the automatic running possible state has been confirmed, so a change from the first stoppage state to the automatic running state can be reliably performed. Note that the driver is notified of changing to this first stoppage state visibly, audibly, or both visibly and audibly via a monitor, a lamp, a speaker, or a buzzer. Thus, the driver can know that preparation for a change to the automatic running state has been completed.

(3) In the first stoppage state, when ultimately an automatic running permission signal that permits automatic running is input to the first control unit 61, running control of the vehicle is transferred to the automatic running control unit 51. One example of this automatic running permission signal is a signal that is generated with a remote operation device operated from outside of the work vehicle, and is transmitted by wireless communications. Thus, from the first stoppage state, automatic running of the vehicle is started with the automatic running control unit 51, and so the vehicle enters the automatic running state (Step #C). Note that in the first state, if the driver forcibly performs a manual running operation, as exception processing, the state changes from the first stoppage state to the manual running state. Of course, also in a case where the above-described various signals or the like that produced a state in which a change from the manual running state to the automatic running state is presumed have been invalidated, the state changes from the first stoppage state to the manual running state.

(4) When changing from the automatic running state to manual running, input to the second control unit 62 of a signal or instruction for establishing conditions for changing from automatic running to manual running is necessary. As example events of such conditions, there are a vehicle speed setting change operation (one type of state detection signal) via operation of a gearshift lever or accelerator operation tool, or a brake pedal, operation of a manual control device, existence of an automatic running unnecessary signal that cancels a request for automatic running by a switch or button, and furthermore an automatic running stop instruction by a remote operation device operated outside of this work vehicle. In response to such an event, the second control unit 62, as preparation for a change from automatic running by the automatic running control unit 51 to manual running by the manual running control unit 52, forcibly stops the vehicle to produce the second stoppage state (Step #D).

Further, in the second stoppage state, when the second control unit 62 confirms that a manual operation for manual running of the vehicle was performed via a state detection signal or the like from the vehicle state detection unit 90, running control of the vehicle is transferred to the manual running control unit 52. Thus, from the second stoppage state, manual running of the vehicle by the manual running control unit 52 is started, so the vehicle returns to the manual running state (Step #A).

(5) Next is a description of an example in which, in the automatic running state, rather than changing to manual running, for example, automatic running is suspended for the purpose of a temporary standby or the like, and afterward automatic running is immediately resumed. In the automatic running state, when an automatic running suspend instruction is input from a remote operation device that is a remotely operated manual running operation unit, the third control unit 63 temporarily suspends automatic running to execute a forced stoppage of the vehicle, thus producing the third stoppage state (Step #E). In this third stoppage state, the vehicle and a work apparatus provided in the vehicle are temporarily stopped, but preparation for manual running is not performed. If the reason for suspending automatic running ends, by giving a resume instruction from the remote operation device to the third control unit 63, the third control unit 63 resumes automatic running by the automatic running control unit 51 (Step #C).

Figure 2:
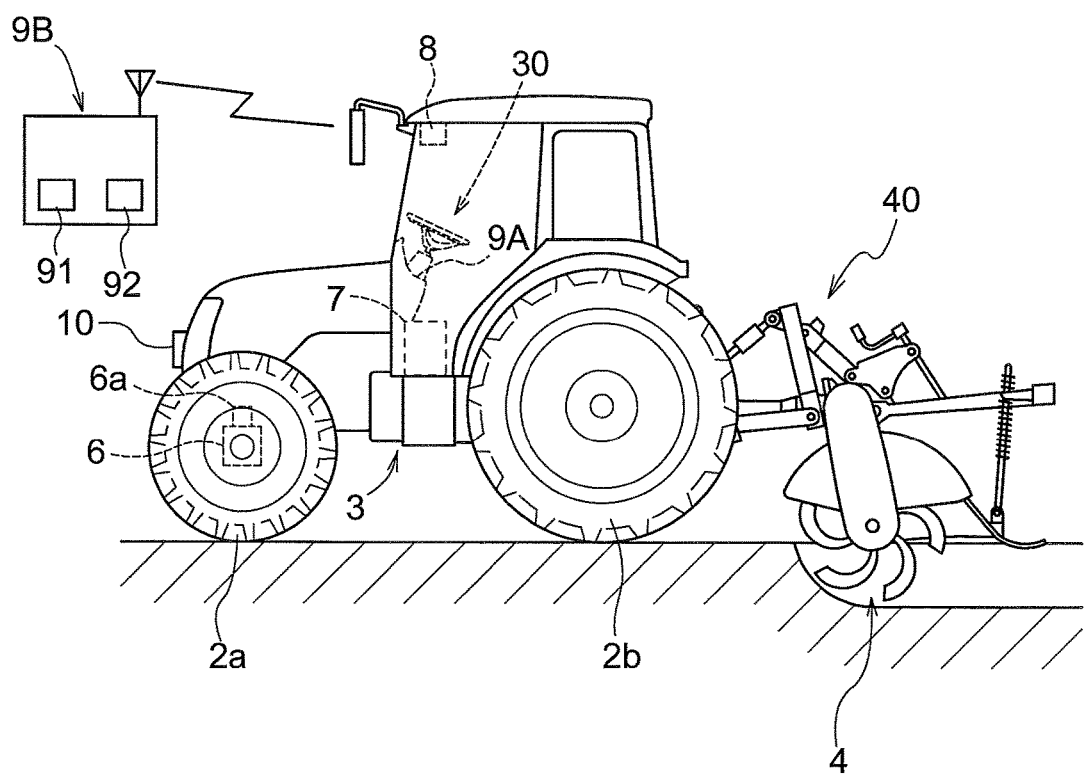
FIG. 2 is a side view of a tractor that is an example of a work vehicle according to the present invention.

Next is a description of one specific embodiment of the work vehicle of the present invention, with reference to FIG. 2 and subsequent drawings. In this embodiment, the work vehicle is a tractor equipped with a work apparatus configured to perform farm work such as tilling work on cultivated land having a ridge as a boundary. In this tractor, a steering unit 30 is formed in the central portion of a vehicle body 3 supported by a front wheel 2a and a rear wheel 2b. A ground working apparatus 4 (in the example in the drawings, a rotary-type tilling apparatus) is provided via a hydraulic raising/lowering mechanism 40 in the rear portion of the vehicle body 3. The front wheel 2a functions as a wheel that steers, and by changing its steering angle, the running direction of the tractor is changed. The steering angle of the front wheel 2a is changed by operation of a steering mechanism 6. A steering driving unit 6a for automatic steering is provided in the steering mechanism 6. Control of an electric motor used to configure the steering driving unit 6a is performed according to a steering driving signal from an electronic control unit 7 described later. The steering angle of the front wheel 2a can be controlled according to conventional operation of an internal operation device 9A, which is disposed in the control unit 30 of the tractor. Also disposed in the control unit 30 is the own vehicle position detection module 8, for measuring an own vehicle position necessary when performing automatic steering. The own vehicle position detection module 8 includes a satellite navigation module ((Global) Satellite Navigation System (Navigation Satellite System) Module) configured as a GNSS module, and an Inertial Navigation System (INS) Module configured as a gyro module incorporating a gyro accelerometer and a magnetic heading sensor. The satellite navigation module includes a satellite antenna for receiving GPS signals and GNSS signals, but this is not shown in FIG. 2.

Figure 3:
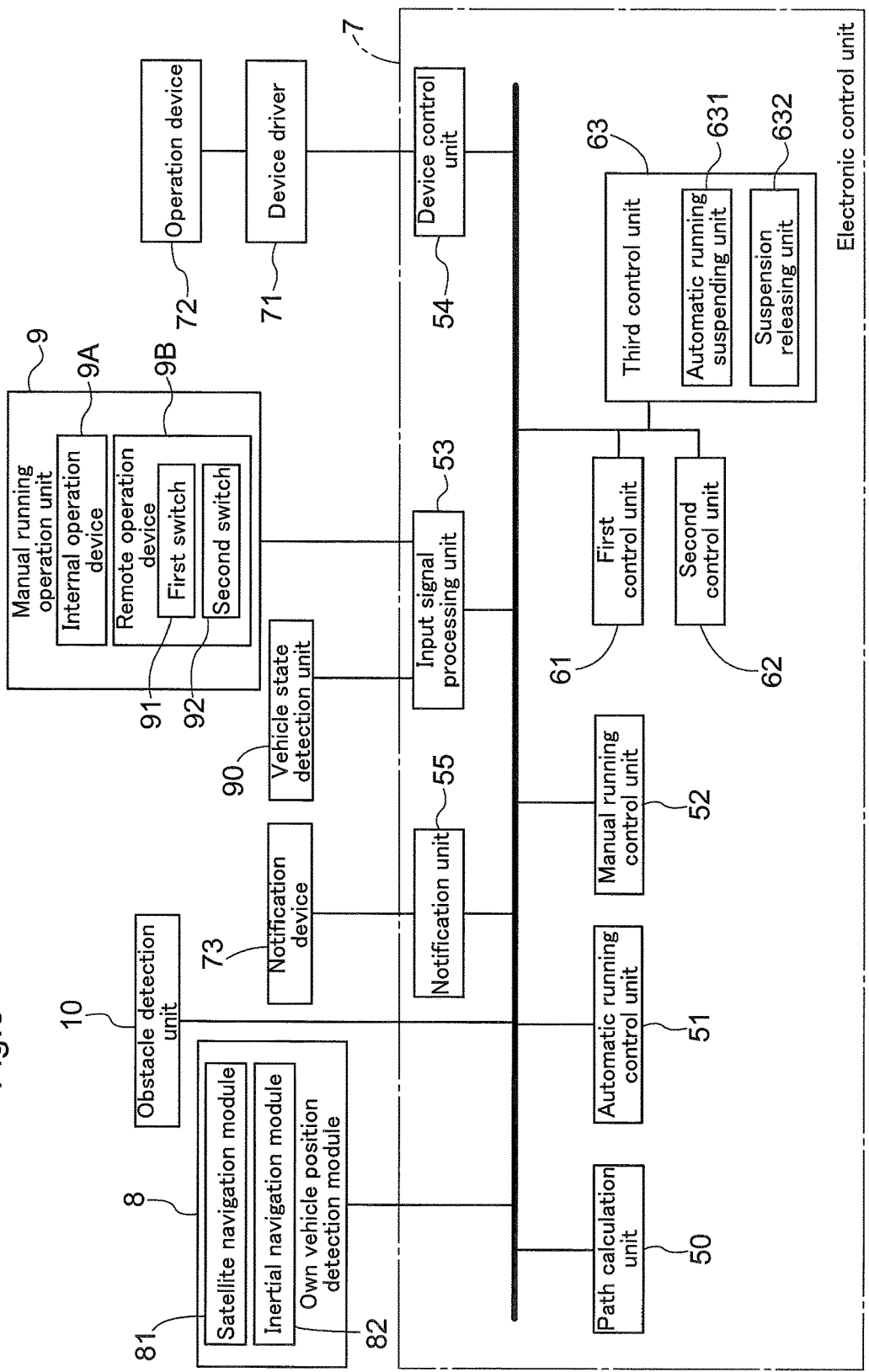
FIG. 3 is a function block diagram of a control system.

FIG. 3 shows a control system provided in this work vehicle. This control system adopts the basic principles that were described with reference to FIG. 1. The control system shown in FIG. 3 includes the electronic control unit 7, the own vehicle position detection module 8, the manual running operation unit 9, a vehicle state detection unit 90 configured with a switch/sensor group, and the like.

The own vehicle position detection module 8 is provided with a satellite navigation module 81 that detects headings of latitude, longitude, and the like using GPS (GNSS), and the configuration of this module is similar to a position measuring unit used in a car navigation system or the like. The own vehicle position detection module 8 is provided with an inertial navigation module 82 that has a gyro accelerometer or the like, in order to detect instantaneous movement (such as direction vectors) or direction of the work vehicle, and in order to complement the satellite navigation module 81.

The manual running operation unit 9 is a generic name of an operation tool operated by an operator in work running of the tractor, and includes the internal operation device 9A provided within the tractor, and a remote operation device 9B that is a remote control operation tool used for operation from outside of the tractor. In this tractor a by-wire system is adopted, and operation of the manual running operation unit 9 is input to the electronic control unit 7 as an operation signal, and an output signal is output in response to that operation signal after performing necessary computation processing or determination processing. The output signal is converted to a control signal by a corresponding device driver 71, and with this control signal, a corresponding operation device 72 operates. For example, the steering driving unit 6a (see FIG. 2), which is one corresponding operation device 72, adjusts the steering angle of the front wheel 2a, which is a wheel that steers, based on a steering driving output signal that is output from the electronic control unit 7.

The vehicle state detection unit 90 is a generic name of a switch or sensor that detects the running state or settings status of the work vehicle, and detection signals from these are input to the electronic control unit 7 and used as input parameters for various control. The vehicle state detection unit 90 includes various detectors that output detection signals that indicate the power transmission state or gearshift state of the tractor, and the operation state of the ground working apparatus 4.

The electronic control unit 7 is substantially constructed with a computer, and as input/output function units, includes an input signal processing unit 53, a device control unit 54, and a notification unit 55. The input signal processing unit 53 processes signals from the manual running operation unit 9 and the vehicle state detection unit 90, and then transfers them to the function units of the electronic control unit 7. The device control unit 54 generates an output signal for causing operation of the operation device 72, and outputs this output signal to the corresponding device driver 71. The notification unit 55 generates information to be notified to the operator, and if this is visible information outputs the information to a notification device 73 such as a display or a lamp, and if this is audible information outputs the information to a notification device 73 such as a speaker or a buzzer.

The electronic control unit 7 further includes, as computation processing function units mainly realized by execution of a program, the path calculation unit 50, the automatic running control unit 51, the manual running control unit 52, the first control unit 61, the second control unit 62, and the third control unit 63. The various functions of these computation processing function units can realize the basic principles of control described with reference to FIG. 1.

The path calculation unit 50 acquires a target running path for automatic work running based on cultivated land information such as a map position of the cultivated land subject to work or ridge position data that prescribes a boundary line of the cultivated land, or work information such as device settings data related to cultivated land work to be implemented (for example, work width). Regarding acquisition of the target running path, it is possible to download from a remotely located management server, or read out from a target running path possessed by the work vehicle itself for separate items of cultivated land and separate work. With an algorithm that calculates the target running path, the target running path may be obtained by each time the algorithm is executed. Also, the target running path may be calculated through teaching running.

The automatic running control unit 51 has a function of managing automatic running of the tractor, and calculates position deviation and heading deviation relative to the target running path of an own position determined based on own vehicle position data transmitted from the own vehicle position detection module 8, and controls steering of the tractor such that this deviation is kept within a predetermined range. Further, the automatic running control unit 51 controls a gearshift mechanism for realizing a vehicle speed that was set, and controls the raising/lowering mechanism 40 and the ground working apparatus 4 in order to perform work that was set.

The manual running control unit 52 has a function of managing manual running of the tractor, and based on operating instructions from the operator that were input via the manual running operation unit 9, controls the operation device 72 to run or stop the tractor as intended by the operator.

The first control unit 61 has a function of managing a change from manual running to automatic running, the second control unit 62 has a function of managing a change from automatic running to manual running, and the third control unit 63 has a function of managing suspending and resuming of automatic running in response to instructions from the manual running operation unit 9. Therefore, an automatic running suspending unit 631 and a suspension releasing unit 632 are constructed in the third control unit 63.

This tractor is provided with an obstacle detection unit 10 configured to detect an obstacle that exists in the surroundings of the tractor. In this embodiment, a processing function when the obstacle detection unit 10 detected an obstacle is included in the third control unit 63.

The obstacle detection unit 10 is provided in the tractor and detects an obstacle that exists in the surroundings of the tractor. The obstacle detection unit 10, for example, can be configured using a laser sensor or a radar sensor, or can also be configured using a camera.

Figure 4:
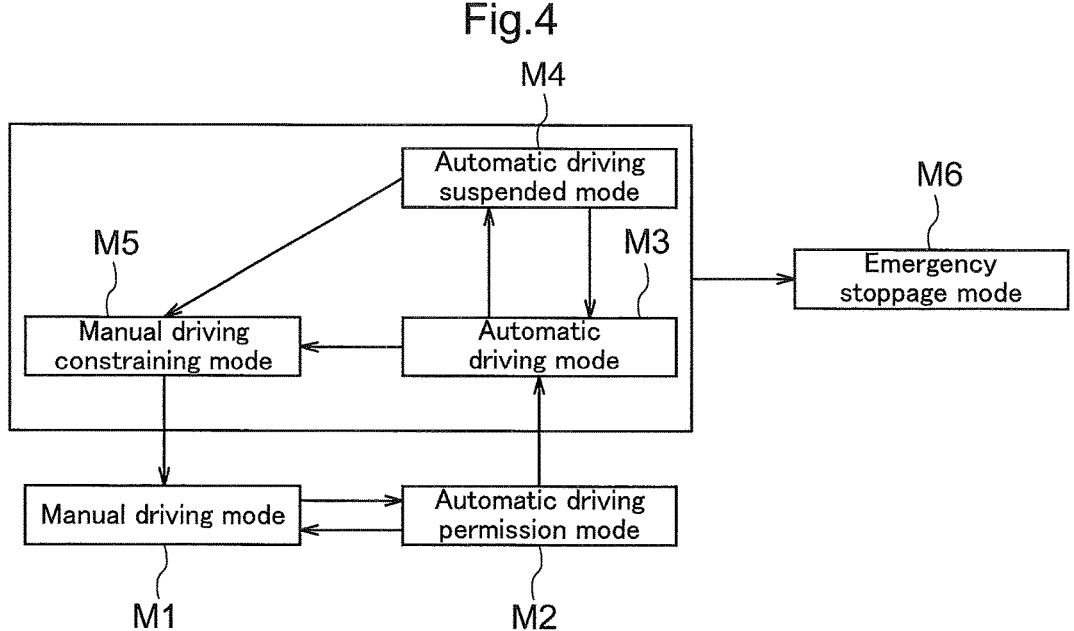
FIG. 4 shows control modes.

FIG. 4 schematically shows, in this tractor, a change from manual running to automatic running, a change from automatic running to manual running, and a change from suspending to resuming automatic running. In this embodiment, control operation of the electronic control unit 7 in each state of the tractor is divided into six control modes, that is, divided into a manual driving mode M1, an automatic driving permission mode M2, an automatic driving mode M3, an automatic driving suspended mode M4, a manual driving constraining mode M5, and an emergency stoppage mode M6.

The manual driving mode M1 is a state in which control related to work running of the tractor has been entrusted to the operator (driver), and in this manual driving mode M1 the tractor runs according to operation by the driver. The automatic driving permission mode M2 is a state in which the tractor can perform automatic running, and is a state awaiting switching from the above manual driving mode M1 to the automatic driving mode M3 described later. In this automatic driving permission mode M2, the tractor is put in a stopped state (corresponding to the first stoppage state in FIG. 1). The automatic driving mode M3 is a state in which control related to running of the tractor has been entrusted to the automatic running control unit 51, and in the automatic driving mode M3 the tractor follows instructions of the automatic running control unit 51.

The automatic driving suspended mode M4 is a state in which a suspend instruction was received from the remote operation device 9B so automatic driving is temporarily suspended, and in the automatic driving suspended mode M4, the tractor is put in a stopped state (corresponding to the third stoppage state in FIG. 1). The manual driving constraining mode M5 is a transition state when switching from automatic driving to manual driving, and in this manual driving constraining mode M5, the tractor is put in a stopped state (corresponding to the second stoppage state in FIG. 1). The emergency stoppage mode M6 is a state in which automatic driving of the tractor could not be continued due to trouble or the like of a system related to automatic driving, so running was stopped, and in this emergency stoppage mode M6 the tractor is put in a stopped state.

When an obstacle is detected by the obstacle detection unit 10, the automatic running suspending unit 631 of the third control unit 63 suspends automatic running of the tractor. However, when the tractor is in such a suspension of automatic running, it is possible to give an instruction to the third control unit 63 to invalidate processing based on obstacle detection via the manual running operation unit 9.

In a case where the tractor is in the automatic driving permission mode M2, when there is an operation of the remote operation device 9B, specifically, when an automatic running start instruction is given based on an operation of the remote operation device 9B, the control mode changes from the automatic driving permission mode M2 to the automatic driving mode M3, and automatic running is started. During automatic running, when the obstacle detection unit 10 detects an obstacle in the surroundings of the tractor, the automatic running suspending unit 631 forcibly suspends automatic running of the tractor. At this time, the tractor changes from the automatic driving mode M3 to the automatic driving suspended mode M4.

When the suspension releasing unit 632 of the third control unit 63 receives an invalidation instruction with the remote operation device 9B during a suspension of automatic running based on obstacle detection when performing automatic running, automatic running is resumed. Thus, the tractor changes from the automatic driving suspended mode M4 to the automatic driving mode M3.

In a case where automatic running has been suspended by the automatic running suspending unit 631, the notification unit 55 gives notification to the surroundings of the tractor that automatic running is suspended. As described above, when an obstacle was detected in the surroundings of the tractor by the obstacle detection unit 10, the automatic running suspending unit 631 suspends automatic running. The notification unit 55 gives notification to the surroundings that automatic running has been suspended in this way. Thus, a user in the surroundings can know the reason that the tractor stopped automatic running.

Also, even when automatic running of the tractor has been suspended by the automatic running suspending unit 631, the obstacle detection unit 10 continuously performs obstacle detection even in a case where there was an invalidation instruction. Thus, even in a case where an obstacle that was detected up to then has moved, it is possible to detect the movement trend of the obstacle, and it is possible to detect an obstacle newly included within the detection range of the obstacle detection unit 10.

On the other hand, the notification unit 55 continuously gives notification that automatic running is suspended even in a case where there was an invalidation instruction. Thus, it is possible to notify the surroundings of the tractor that suspension of automatic running due to detection of an obstacle by the obstacle detection unit 10 has been released.

Following is an example of tractor states and driver operations in the above-described control modes, i.e., in the manual driving mode M1, the automatic driving permission mode M2, the automatic driving mode M3, and the manual driving constraining mode M5.

(1) The manual driving mode M1 is a state in which control related to running/work of the tractor has been entrusted to the driver. The automatic driving permission mode M2 is a state in which the tractor settings enable automatic running, that is, a state awaiting a mode switching signal. The automatic driving mode M3 is a state in which control related to running/work of the tractor has been entrusted to an automatic control system. The manual driving constraining mode M5 is a state when switching from automatic driving to manual driving.

(2) When a main key is ON, a control system of the tractor that performs unmanned running certainly starts from the manual driving mode M1.

(3) The manual driving mode M1 changes to the automatic driving permission mode M2 with the below condition set;

(Xa) a shuttle operation tool (forward/backward operation tool) is set to neutral, (Xb) a PTO switch (one example of a PTO driving operation tool) is set to OFF, (Xc) confirmation of input of information necessary for automatic running (GPS signal), and (Xd) confirmation of a state with no trouble in the control system.

In a state in which all of conditions Xa to Xd are established (referred to as a state X), when an automatic driving switching setting (switch or liquid crystal operation) provided in the unmanned vehicle has been set to 'automatic', the control mode changes to the automatic driving permission mode M2.

(4) When state X is established, the fact that preparation for automatic driving has been completed is indicated to the user by a lamp lighted state or by a liquid crystal screen display.

(5) In the automatic driving permission mode M2, the tractor maintains a stopped state.

(6) In a case where state X is not established in the automatic driving permission mode M2, or the automatic driving switching setting has been set to 'manual', the control mode returns to the manual driving mode.

(7) In a state where the control mode has been set to the automatic driving permission mode, when an automatic driving execution setting (manual input via a switch, touch panel, or the like) of the vehicle performing manual running is set to 'execute automatic driving', the control mode switches to the automatic driving mode.

(8) In the automatic driving mode M3, control related to running and work is performed according to control instructions from an operation device for giving an automatic running instruction of the vehicle performing unmanned running.

(9) When one of the below conditions (condition Y) is established during automatic driving, the control mode changes to the manual driving constraining mode.

Condition Y: any of the below is established:

(Ya) Trouble occurs in the control system of the vehicle performing unmanned running or the vehicle performing manual running, (Yb) there is a change in the vehicle speed setting (change using a gearshift lever, brake, accelerator, or the like) of the vehicle performing unmanned running, (Yc) there is steering operation of the vehicle performing unmanned running, (Yd) there is a switch to 'manual' for automatic driving switching setting of the vehicle that is performing unmanned running, (Ye) there is a switch to 'end automatic driving' for automatic driving execution setting of the vehicle performing manual running, or (Yf) there is an instruction for forcible mode switching from the vehicle performing manual running.

(10) In the manual driving constraining mode M5, the tractor stops running and control of a work apparatus that includes a raising/lowering mechanism, and sets a brake mechanism to ON. Setting of engine speed based on an accelerator operation tool,

(11) When one of the below conditions (condition Z) is established, the manual driving constraining mode M5 switches to the manual driving mode M1.

Condition Z: any of the below is established:

(Za) A brake pedal is depressed, or (Zb) a clutch pedal is depressed.

Note that when such a pedal depression occurs, it is preferable to confirm that Za or Zb continues without a break for a fixed time period.

(12) When in the automatic driving mode M3 or the manual driving mode (M1), notification is given to the driver or a person in the vicinity of the tractor that the driving mode of the tractor is in a state different from normal control, by visible information of a lamp or a monitor screen (liquid crystal screen), or by audible information of a buzzer or a melody. The notification pattern in these notifications preferably is changed according to the mode.

Next is a specific description related to starting, suspending, and suspension release (resuming) of automatic running via the manual running operation unit 9. In the present embodiment, a first switch 91 and a second switch 92 are provided in the remote operation device 9B. The first switch 91 and the second switch 92 are both configured using momentary-type switches having two contact points, and respectively different control is assigned to these switches according to a depressed time period (time period that the switch is depressed).

Figure 5:
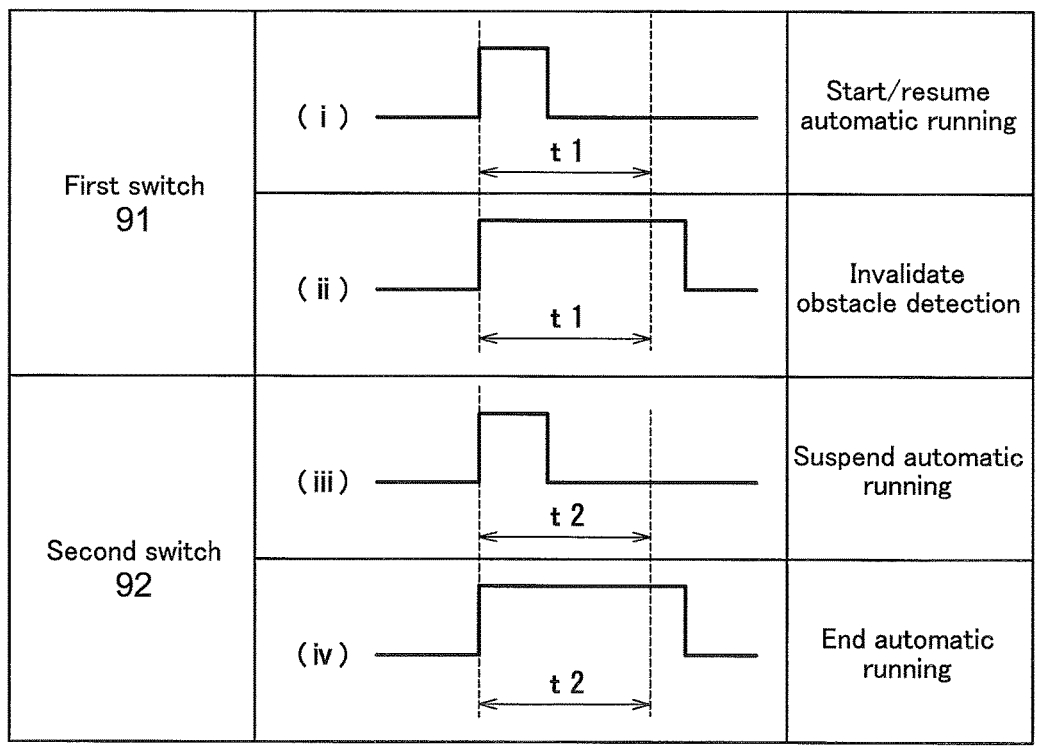
FIG. 5 shows instruction content corresponding to when a first switch provided in a remote operation device is depressed and when a second switch provided in the remote operation device is depressed.
Figure 8:
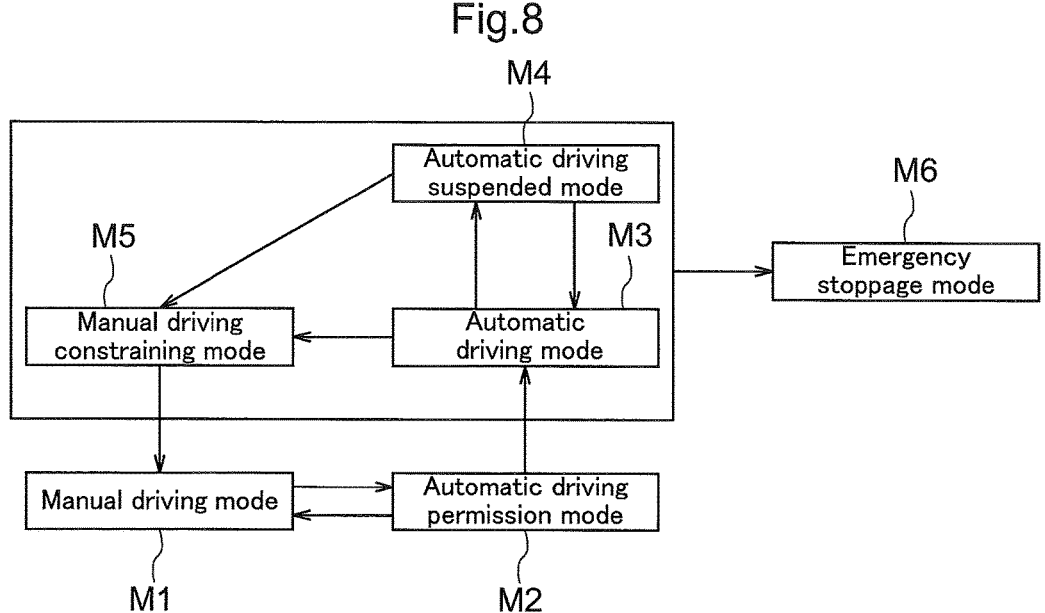
FIG. 8 shows control modes.

The first switch 91 performs a start instruction to start automatic running in a case where, during a stoppage of the tractor, the depressed time period is less than a first time period that has been set in advance. The first time period that has been set in advance is set in advance in the remote operation device 9B, and in the example shown in FIG. 5, t1 corresponds to this time period. In a case where the depressed time period of the first switch 91, as shown by (i) in FIG. 5, is less than t1, the remote operation device 9B gives an instruction to the third control unit 63 to execute automatic running via a wireless communications unit of the electronic control unit. At this time, when the tractor is in a stopped state, and in the automatic driving permission mode M2, the third control unit 63 causes the tractor to perform automatic running. Also, when the tractor is in a state with automatic running suspended and is in the automatic driving suspended mode M4, the third control unit 63 causes the tractor to resume automatic running.

Also, in a state with automatic running suspended, when the depressed time period is at least the first time period, the first switch 91 gives an invalidation instruction to invalidate obstacle detection by the obstacle detection unit 10. The first time period that has been set in advance is the above-described t1. In a case where the depressed time period of the first switch 91, as shown by (ii) in FIG. 5, is at least t1, the remote operation device 9B gives an instruction to the electronic control unit 7 to stop obstacle detection processing. At this time, when the tractor is in a state with automatic running suspended and is in the automatic driving suspended mode M4, the third control unit 63 causes the tractor to perform automatic running while the first switch 91 is being depressed. Note that 'while the first switch 91 is being depressed' may mean a period from when the above time period set in advance (0 in this example) has passed until when depressing of the first switch 91 is released, or may mean a period from when the first switch 91 was depressed until when that depressing is released, including the time period that was set in advance.

Also, at this time, in a case where the obstacle detection unit 10 is detecting an obstacle when depressing of the first switch 91 ends, automatic running is again suspended, and in a case where the obstacle detection unit 10 is not detecting an obstacle, the automatic running is continued.

The second switch 92 suspends automatic running in a case where, during automatic running, the depressed time period is less than a second time period that has been set in advance. The second time period that has been set in advance is set in advance in the remote operation device 9B, and in the example shown in FIG. 5, t2 corresponds to this time period. The second time period may be set to the same time period as the above-described first time period, or may be set to a different time period. In a case where the depressed time period of the second switch 92, as shown by (iii) in FIG. 5, is less than t2, the remote operation device 9B wirelessly gives an instruction to the electronic control unit 7 to suspend automatic running. At this time, when the tractor is performing automatic running and is in the automatic driving mode M3, the third control unit 63 suspends automatic running of the tractor. Thus, the tractor changes to the automatic driving suspended mode M4.

Also, the second switch 92 ends automatic driving in a case where, during automatic running, the depressed time period is at least the second time period. The second time period that has been set in advance is the above-described t2. In a case where the depressed time period of the second switch 92, as shown by (iv) in FIG. 5, is at least t2, the remote operation device 9B wirelessly transmits an instruction to the electronic control unit 7 to end automatic running. At this time, when the tractor is performing automatic running and is in the automatic driving mode M3, the third control unit 63 ends automatic running of the tractor. Thus, the tractor changes to the manual driving constraining mode M5.

Separate Embodiments of First Embodiment (1) In the above embodiment, a tractor is adopted as the work vehicle, but an agricultural work vehicle such as a rice planter or a combine, or a civil engineering/construction work vehicle such as a bulldozer, may also be adopted.

(2) The function units of the control system in FIG. 1 and FIG. 3 are divided as one example, but combination or separation of each function unit is possible, and all variations thereof fall within the patented scope of the present application.

(3) In the above embodiment, the notification unit 55 continuously gives notification of being in a suspended state even when there was an invalidation instruction, but a configuration is also possible in which the notification unit 55 suspends the notification when there was an invalidation instruction.

(4) In the above embodiment, the obstacle detection unit 10 continuously performed obstacle detection even when there was an invalidation instruction, but a configuration is also possible in which the obstacle detection unit 10 suspends obstacle detection when there was an invalidation instruction.

(5) In the above embodiment, the first switch 91 gives a start instruction in a case where, during a stoppage of the tractor, the depressed time period is less than the first time period that was set in advance, and gives an invalidation instruction in a case where, in a state with automatic running suspended, the depressed time period is at least the first time period, but a configuration may also be adopted in which the start instruction and the invalidation instruction are assigned to separate switches. Of course, this can also be realized with another configuration.

Second Embodiment

Below, a second embodiment will be described with reference to FIGS. 6 to 10.

In the configuration of this second embodiment, the running control apparatus of the work vehicle can perform automatic running as exception processing even in a case where the obstacle detection unit detected an obstacle during automatic running of the work vehicle and so automatic running has been suspended.

FIG. 6 is a conceptual diagram that shows the configuration of a running control apparatus 101. The running control apparatus 101, in order to cause a work vehicle 100 to perform automatic running, is configured with an obstacle detection unit 110, a controller 120, an automatic running suspending unit 130, a suspension releasing unit 140, and a notification unit 150 shown in FIG. 6. The running control apparatus 101 is provided in the work vehicle 100 as shown in FIG. 7. Although the work vehicle 100 is shown as a tractor in FIG. 7, this is merely an example, and the present embodiment is also applicable to other vehicles.

The obstacle detection unit 110 is provided in the work vehicle 100, and detects an obstacle that exists in the surroundings of the work vehicle 100. An 'obstacle that exists in the surroundings of the work vehicle 100' means an object that is an obstruction when the work vehicle 100 performs automatic running. The obstacle detection unit 110 can be configured using, for example, a laser sensor or a radar sensor, or can be configured using a camera. The method of detecting an obstacle using any of such a laser sensor, radar sensor, or camera is publicly known, so a description thereof is omitted here.

The controller 120 has a switch 123 that performs a start instruction to cause the work vehicle 100 to start automatic running, a suspend instruction to cause the work vehicle 100 to suspend automatic running, and an invalidation instruction to invalidate obstacle detection by the obstacle detection unit 110. In the present embodiment, the controller 120 is provided separated from the work vehicle 100, and performs wireless communications with a communications apparatus 160 provided in the work vehicle 100.

Here, the work vehicle 100 of the present embodiment is configured to be capable of performing not only automatic running, but also manual running. The work vehicle 100, so as to be capable of safely performing automatic running and manual running, has six control modes shown in FIG. 8, namely a manual driving mode M1, an automatic driving permission mode M2, an automatic driving mode M3, an automatic driving suspended mode M4, a manual driving constraining mode M5, and an emergency stoppage mode M6.

The manual driving mode M1 is a state in which control related to running of the work vehicle 100 has been entrusted to a driver, and in this manual driving mode M1 the work vehicle 100 runs according to operation by the driver. The automatic driving permission mode M2 is a state in which the work vehicle 100 can perform automatic running, and is a state awaiting switching from the above manual driving mode M1 to the automatic driving mode M3 described later. In this automatic driving permission mode M2, the work vehicle 100 is put in a stopped state. The automatic driving mode M3 is a state in which control related to running of the work vehicle 100 has been entrusted to the running control apparatus 101, and in the automatic driving mode M3 the work vehicle 100 follows instructions of the running control apparatus 101.

The automatic driving suspended mode M4 is a state in which a suspend instruction was received from the controller 120 so automatic driving is temporarily suspended, and in the automatic driving suspended mode M4, the work vehicle 100 is put in a stopped state. The manual driving constraining mode M5 is a transition state when switching from automatic driving to manual driving, and in this manual driving constraining mode M5, the work vehicle 100 is put in a stopped state. The emergency stoppage mode M6 is a state in which automatic driving of the work vehicle 100 could not be continued due to trouble or the like of a system related to automatic driving, so running was stopped, and in this emergency stoppage mode M6 the work vehicle 100 is put in a stopped state.

Among these modes, changing from the current mode to another mode is performed according to operation of an operation apparatus provided in the work vehicle 100 and operation of the controller 120. The modes to which it is possible to change from each mode are indicated with arrows in FIG. 8.

Above, 'a start instruction to cause the work vehicle 100 to start automatic running' corresponds to an instruction to change from the automatic driving permission mode M2 to the automatic driving mode M3, and an instruction to change from the automatic driving suspended mode M4 to the automatic driving mode M3, and 'a suspend instruction to cause the work vehicle 100 to suspend automatic running' corresponds to an instruction to change from the automatic driving mode M3 to the automatic driving suspended mode M4.

The work vehicle 100 suspends automatic running when an obstacle is detected by the above obstacle detection unit 110, and this will be described in detail later. Above, 'an invalidation instruction to invalidate obstacle detection by the obstacle detection unit 110' corresponds to an instruction to invalidate object detection to the work vehicle 100 in such a state with automatic running suspended.

In a case where the obstacle detection unit 110 detected an obstacle after the work vehicle 100 started automatic running in response to a start instruction, the automatic running suspending unit 130 causes the work vehicle 100 to suspend automatic running regardless of whether or not there was a suspend instruction. The work vehicle 100, when in the automatic driving permission mode M2, if there is a start instruction by operation of the switch 123, is changed to the automatic driving mode M3, and starts automatic running. During such automatic running, if the obstacle detection unit 110 detects an obstacle in the surroundings of the work vehicle 100, the automatic running suspending unit 130 preferentially suspends automatic running of the work vehicle 100 regardless of whether or not there was a suspend instruction by the switch 123. At this time, the work vehicle 100 changes from the automatic driving mode M3 to the automatic driving suspended mode M4.

The switch 123 may be configured to give an invalidation instruction to invalidate the foreign object detection by the obstacle detection unit 100 throughout the period that the switch 123 is being depressed, or may be configured to give the invalidation instruction for only a time period set in advance when the switch 123 is depressed.

Also, in a case where there was an invalidation instruction during suspension of automatic running by the automatic running suspending unit 130, the suspension releasing unit 140 releases the suspension of automatic running. The invalidation instruction is transmitted by wireless communications via the switch 123. This operation of the switch 123 is suitably performed when the user has determined that the obstacle that was detected during automatic running of the work vehicle 100 will not be a hindrance. When the work vehicle 100 receives the invalidation instruction, automatic running is resumed. At this time, the work vehicle 100 changes from the automatic driving suspended mode M4 to the automatic driving mode M3.

When automatic running has been suspended by the automatic running suspending unit 130, the notification unit 150 notifies the surroundings of the work vehicle 100 that automatic running is suspended. As described above, the automatic running suspending unit 130 suspends automatic running when an obstacle has been detected in the surroundings of the work vehicle 100 by the obstacle detection unit 110. The notification unit 150 gives notification to the surroundings that automatic running has been suspended in this way. Thus, a user in the surroundings can know the reason that the work vehicle 100 stopped automatic running. This sort of notification unit 150 may give an audible notification using a buzzer, or may give a visible notification using a warning lamp.

Also, even when automatic running of the work vehicle 100 has been suspended by the automatic running suspending unit 130, the obstacle detection unit 110 continues to perform obstacle detection even if there was an invalidation instruction. Thus, even in a case where an obstacle that was detected up to then has moved, the obstacle detection unit 110 can detect the movement trend of the obstacle, and it is possible to detect an obstacle newly included within the detection range of the obstacle detection unit 110.

On the other hand, the notification unit 150 continuously gives notification that automatic running is suspended even in a case where there was an invalidation instruction. Thus, it is possible to notify the surroundings of the work vehicle 100 that suspension of automatic running due to detection of an obstacle by the obstacle detection unit 110 has been released.

Next is a description of the switch 123 of the controller 120. In the present embodiment, the controller 120 is configured with the switch 123 and a switch 124. Below, for ease of understanding, the switch 123 is referred to as a first switch 123, and the switch 124 is referred to as a second switch 124. The first switch 123 and the second switch 124 are both configured using momentary-type switches having two contact points, and respectively different control is assigned to these switches according to a depressed time period (time period that the switch is depressed).

Figure 9:
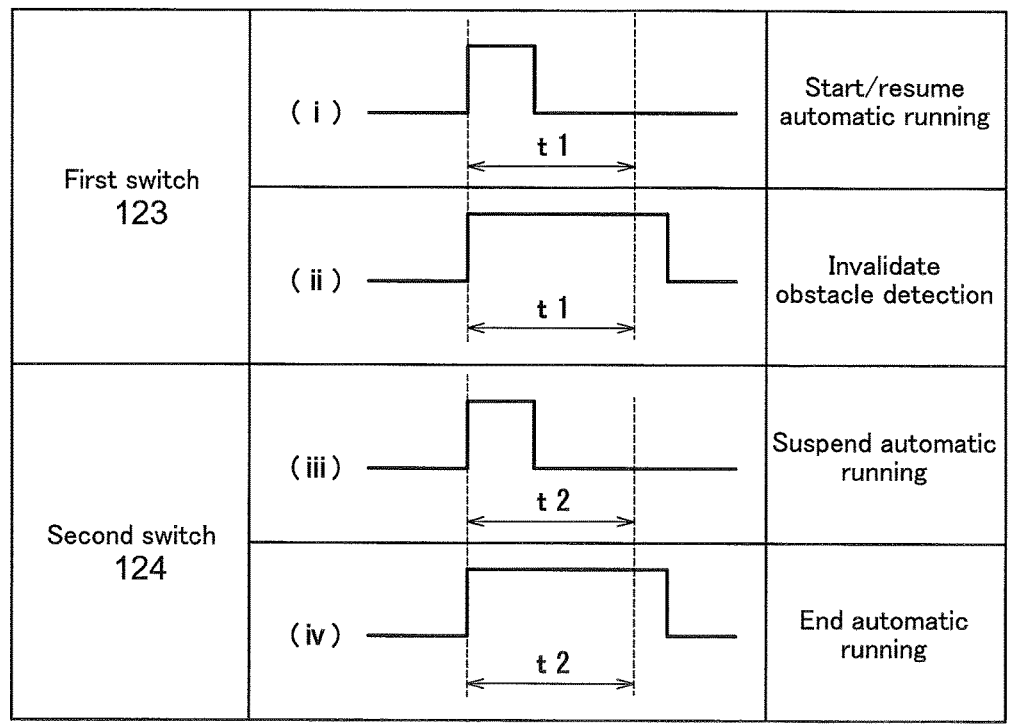
FIG. 9 shows instruction content corresponding to when a switch is depressed.

The first switch 123 performs a start instruction to start automatic running in a case where, during a stoppage of the work vehicle 100, the depressed time period is less than a first time period that has been set in advance. The first time period that has been set in advance is set in advance in the controller 120, and in the example shown in FIG. 9, t1 corresponds to this time period. In a case where the depressed time period of the first switch 123, as shown by (i) in FIG. 9, is less than t1, the controller 120 wirelessly transmits an instruction to execute automatic running to a running control unit 200 via the communications apparatus 160 of the work vehicle 100. At this time, when the work vehicle 100 is in a stopped state, and in the automatic driving permission mode M2, the running control unit 200 causes the work vehicle 100 to perform automatic running. Also, when the work vehicle 100 is in a state with automatic running suspended and is in the automatic driving suspended mode M4, the running control unit 200 causes the work vehicle 100 to resume automatic running.

Also, in a state with automatic running suspended, when the depressed time period is at least the first time period, the first switch 123 gives an invalidation instruction to invalidate obstacle detection by the obstacle detection unit 110. The first time period that has been set in advance is the above-described t1. In a case where the depressed time period of the first switch 123, as shown by (ii) in FIG. 9, is at least t1, the controller 120 wirelessly transmits an instruction to stop obstacle detection processing to the obstacle detection unit 110 via the communications apparatus 160 of the work vehicle 100. At this time, when the work vehicle 100 is in a state with automatic running suspended and is in the automatic driving suspended mode M4, the running control unit 200 causes the work vehicle 100 to perform automatic running while the first switch 123 is being depressed. Note that 'while the first switch 123 is being depressed' may mean a period from when the above time period set in advance (0 in this example) has passed until when depressing of the first switch 123 is released, or may mean a period from when the first switch 123 was depressed until when that depressing is released, including the time period that was set in advance.

Also, at this time, in a case where the obstacle detection unit 110 is detecting an obstacle when depressing of the first switch 123 ends, automatic running is again suspended, and in a case where the obstacle detection unit 110 is not detecting an obstacle, the automatic running is continued.

The second switch 124 suspends automatic running in a case where, during automatic running, the depressed time period is less than a second time period that has been set in advance. The second time period that has been set in advance is set in advance in the controller 120, and in the example shown in FIG. 9, t2 corresponds to this time period. The second time period may be set to the same time period as the above-described first time period, or may be set to a different time period. In a case where the depressed time period of the second switch 124, as shown by (iii) in FIG. 9, is less than t2, the controller 120 wirelessly transmits an instruction to suspend automatic running to the running control unit 200 via the communications apparatus 160 of the work vehicle 100. At this time, when the work vehicle 100 is performing automatic running and is in the automatic driving mode M3, the running control unit 200 suspends automatic running of the work vehicle 100, and thus the work vehicle 100 changes to the automatic driving suspended mode M4.

Also, the second switch 124 ends automatic driving in a case where, during automatic running, the depressed time period is at least the second time period. The second time period that has been set in advance is the above-described t2. In a case where the depressed time period of the second switch 124, as shown by (iv) in FIG. 9, is at least t2, the controller 120 wirelessly transmits an instruction to end automatic running to the running control unit 200 via the communications apparatus 160 of the work vehicle 100. At this time, when the work vehicle 100 is performing automatic running and is in the automatic driving mode M3, the running control unit 200 ends automatic running of the work vehicle 100, and thus the work vehicle 100 changes to the manual driving constraining mode M5.

Next, processing of the running control apparatus 101 will be described with reference to the flowchart in FIG. 10. When there is an instruction to start automatic running (Step #1: Yes), the running control unit 200 starts automatic running of the work vehicle 100 (Step #2). When the obstacle detection unit 110 detects an obstacle during automatic running (Step #3: Yes), the automatic running suspending unit 130 suspends automatic running (Step #4).

In a case where there is not an invalidation instruction to invalidate obstacle detection by the obstacle detection unit 110 (Step #5: No), automatic running is suspended until an obstacle is no longer detected (Step #3: No). On the other hand, in a case where there is an invalidation instruction to invalidate obstacle detection by the obstacle detection unit 110 (Step #5: Yes), the suspension releasing unit 140 invalidates obstacle detection by the obstacle detection unit 110, and the running control unit 200 performs automatic running as long as there is an invalidation instruction (Step #6). This automatic running is continued while there is an invalidation instruction (Step #7: No).

In a case where the invalidation instruction ends (Step #7: Yes), and at that time there is not an instruction to end automatic running (Step #8: No), automatic running is resumed (Step #2). On the other hand, in a case where there is an instruction to end automatic running (Step #8: Yes), automatic running is ended. The running control apparatus 101 causes the work vehicle 100 to perform automatic running in this way.

Separate Embodiments of Second Embodiment (1) In the above embodiment, the notification unit 150 continuously gives a notification that automatic running is suspended even in a case where there is an invalidation instruction, but a configuration is also possible in which the notification unit 150 suspends the notification in a case where there is an invalidation instruction.

(2) In the above embodiment, the obstacle detection unit 110 continuously performs obstacle detection even in a case where there is an invalidation instruction, but a configuration is also possible in which the obstacle detection unit 110 suspends obstacle detection in a case where there is an invalidation instruction.

(3) In the above embodiment, the first switch 123, during a stoppage of the work vehicle 100, performs a start instruction in a case where the depressed time period is less than the first time period that has been set in advance, and during a suspension of automatic running, performs an invalidation instruction in a case where the depressed time period is at least the first time period, but a configuration may also be adopted in which the start instruction and the invalidation instruction are assigned to separate switches. Of course, this can also be realized with another configuration.

INDUSTRIAL APPLICABILITY

The present invention is applicable to work vehicles that perform work running while switching between automatic running and manual running.

DESCRIPTION OF REFERENCE SIGNS

First Embodiment

8: own vehicle position detection module
9: manual running operation unit
9A: internal operation device
9B: remote operation device
50: path calculation unit
51: automatic running control unit
52: manual running control unit
61: first control unit 62: second control unit
63: third control unit Second Embodiment 100: work vehicle
101: running control apparatus
110: obstacle detection unit
120: controller
123: first switch (switch)
130: automatic running suspending unit
140: suspension releasing unit
150: notification unit

The invention claimed is:

1. A running control apparatus configured to cause a work vehicle to perform automatic running, the apparatus comprising:
an obstacle detection unit provided in the work vehicle and configured to detect an obstacle that exists in surroundings of the work vehicle;
a controller having a switch configured to perform a start instruction to the work vehicle to start automatic running, a suspend instruction to suspend the automatic running, and an invalidation instruction to invalidate obstacle detection by the obstacle detection unit;
an automatic running suspending unit configured to, after the work vehicle started automatic running in response to the start instruction, in a case where the obstacle detection unit detected the obstacle, suspend automatic running of the work vehicle regardless of whether or not there is the suspend instruction from the switch of the controller;
a suspension releasing unit configured to release the suspension of automatic running in a case where there was the invalidation instruction during the suspension of automatic running by the automatic running suspending unit; and
a notification unit configured to notify the surroundings of the work vehicle that automatic running is suspended in a case where automatic running has been suspended by the automatic running suspending unit,
wherein the notification unit continuously gives notification that automatic running is suspended even in a case where there was the invalidation instruction.

2. The running control apparatus according to claim 1, wherein the obstacle detection unit continuously performs the obstacle detection even in a case where there was the invalidation instruction.

3. A running control apparatus configured to cause a work vehicle to perform automatic running, the apparatus comprising:
an obstacle detection unit provided in the work vehicle and configured to detect an obstacle that exists in surroundings of the work vehicle;
a controller having a switch configured to perform a start instruction to the work vehicle to start automatic running, a suspend instruction to suspend the automatic running, and an invalidation instruction to invalidate obstacle detection by the obstacle detection unit;
an automatic running suspending unit configured to, after the work vehicle started automatic running in response to the start instruction, in a case where the obstacle detection unit detected the obstacle, suspend automatic running of the work vehicle regardless of whether or not there is the suspend instruction from the switch of the controller; and
a suspension releasing unit configured to release the suspension of automatic running in a case where there was the invalidation instruction during the suspension of automatic running by the automatic running suspending unit,
wherein the switch of the controller performs the invalidation instruction throughout a period where the switch is being depressed.

4. The running control apparatus according to claim 3, wherein the obstacle detection unit continuously performs the obstacle detection even in a case where there was the invalidation instruction.

5. A running control apparatus configured to cause a work vehicle to perform automatic running, the apparatus comprising:
an obstacle detection unit provided in the work vehicle and configured to detect an obstacle that exists in surroundings of the work vehicle;
a controller having a switch configured to perform a start instruction to the work vehicle to start automatic running, a suspend instruction to suspend the automatic running, and an invalidation instruction to invalidate obstacle detection by the obstacle detection unit;
an automatic running suspending unit configured to, after the work vehicle started automatic running in response to the start instruction, in a case where the obstacle detection unit detected the obstacle, suspend automatic running of the work vehicle regardless of whether or not there is the suspend instruction from the switch of the controller; and
a suspension releasing unit configured to release the suspension of automatic running in a case where there was the invalidation instruction during the suspension of automatic running by the automatic running suspending unit,
wherein when the switch of the controller is depressed, the switch performs the invalidation instruction only for a period of time that has been set in advance.

6. The running control apparatus according to claim 5, wherein the obstacle detection unit continuously performs the obstacle detection even in a case where there was the invalidation instruction.

7. A running control apparatus configured to cause a work vehicle to perform automatic running, the apparatus comprising:
an obstacle detection unit provided in the work vehicle and configured to detect an obstacle that exists in surroundings of the work vehicle;
a controller having a switch configured to perform a start instruction to the work vehicle to start automatic running, a suspend instruction to suspend the automatic running, and an invalidation instruction to invalidate obstacle detection by the obstacle detection unit;
an automatic running suspending unit configured to, after the work vehicle started automatic running in response to the start instruction, in a case where the obstacle detection unit detected the obstacle, suspend automatic running of the work vehicle regardless of whether or not there is the suspend instruction from the switch of the controller; and
a suspension releasing unit configured to release the suspension of automatic running in a case where there was the invalidation instruction during the suspension of automatic running by the automatic running suspending unit,
wherein the switch of the controller, during a stoppage of the work vehicle, performs the start instruction in a case where the depressed time period is less than the first time period that has been set in advance, and during the suspension of automatic running, performs the invalidation instruction in a case where the depressed time period is at least the first time period.

8. The running control apparatus according to claim 7, wherein the obstacle detection unit continuously performs the obstacle detection even in a case where there was the invalidation instruction.

* * * * *